(12) United States Patent
Savitski et al.

(10) Patent No.: US 10,538,036 B2
(45) Date of Patent: Jan. 21, 2020

(54) LASER WELDING SYSTEM AND METHOD USING COOLING MASK TO CONTROL THE WIDTH OF THE WELD

(71) Applicant: Dukane IAS, LLC, St. Charles, IL (US)

(72) Inventors: Alexander Savitski, Arlington Heights, IL (US); Grzegorz Zdzislaw Bugaj, Burbank, IL (US); Leo Klinstein, Glenview, IL (US)

(73) Assignee: Dukane IAS, LLC, St. Charles, IL (US)

( * ) Notice: Subject to any disclaimer, the term of this patent is extended or adjusted under 35 U.S.C. 154(b) by 235 days.

(21) Appl. No.: 15/266,182

(22) Filed: Sep. 15, 2016

(65) Prior Publication Data

US 2018/0071990 A1 Mar. 15, 2018

(51) Int. Cl.
*B29C 65/16* (2006.01)
*B29C 65/00* (2006.01)
(Continued)

(52) U.S. Cl.
CPC ...... *B29C 65/1635* (2013.01); *B29C 65/1696* (2013.01); *B29C 66/73366* (2013.01);
(Continued)

(58) Field of Classification Search
CPC ............ B29C 65/1685; B29C 65/1629; B29C 65/1616; B29C 65/1635; B29C 65/16
See application file for complete search history.

(56) References Cited

U.S. PATENT DOCUMENTS 6,465,757 B1 * 10/2002 Chen ................... B29C 65/1635
219/121.6
7,282,665 B2 10/2007 Chen
(Continued)

FOREIGN PATENT DOCUMENTS

DE 102014108894 12/2015
EP 2813347 12/2014
JP 2004063332 2/2004

OTHER PUBLICATIONS

Olowinsky, Dr. Alexander, "Vortrag Technologie Seminar 2008 Verfahrenstechnik and Anforderungen an die Produktkonstruktion fur das Kunstsoffschweiben mit Laserstrahlung", ERW, Sep. 24, 2008, pp. 1-56, retrieved on Jul. 16, 2015 at http://www.wolf-produktionssysteme.de/de/veroeffentlicht/technologieseminar/technologieseminar2008/vortragl.pdf (pp. 50-54).
(Continued)

*Primary Examiner* — Daniel McNally
(74) *Attorney, Agent, or Firm* — Nixon Peabody LLP

(57) ABSTRACT

A laser welding method and system for joining portions of first and second workpieces of thermoplastic material that is partially permeable to a laser beam but absorbs radiation from the laser beam. The first and second workpieces, which are made of material that absorbs radiation from a laser beam, are clamped together. A mask is placed on a first surface of the first workpiece, the first surface being opposite the surface engaging the second workpiece. The mask is impermeable to a laser beam and forms a slot for passing a laser beam to the portion of the first surface of the upper workpiece exposed by the slot, so that heating and melting of the material of the workpieces is limited to the width of the slot. A laser beam is directed onto the slot and moved in a manner to illuminate the slot to melt and join the workpieces.

9 Claims, 2 Drawing Sheets

(51) Int. Cl.
    *B29L 9/00*     (2006.01)
    *B29K 101/12*   (2006.01)
(52) U.S. Cl.
    CPC .. *B29K 2101/12* (2013.01); *B29K 2995/0026* (2013.01); *B29L 2009/00* (2013.01)

(56) References Cited

U.S. PATENT DOCUMENTS

| | | | |
|---|---|---|---|
| 8,505,604 | B2 | 8/2013 | Stauffer |
| 9,393,738 | B2 | 7/2016 | Kugelmann |
| 2003/0196750 | A1 | 10/2003 | Sakai et al. |
| 2006/0134994 | A1* | 6/2006 | Yasuda .............. B23K 26/0661 439/676 |
| 2006/0237129 | A1* | 10/2006 | Chen ................ B23K 26/0604 156/272.8 |
| 2006/0283544 | A1* | 12/2006 | Mori ................. B29C 65/1635 156/272.8 |
| 2009/0252978 | A1* | 10/2009 | Katayama ......... B29C 66/30325 428/457 |
| 2011/0200802 | A1* | 8/2011 | Li .......................... B29C 66/71 428/198 |

OTHER PUBLICATIONS

Rennert et al., "Laser-adopted construction for plastic welding", retrieved on Jan. 15, 2007 from http://www.rofin.com/deutsch/anwendunen/laser-mikro-micro/data/E_PlastEurope02-04_Laser_adapted_Construction.pclf (p. 6, col. 1).
International Search Report and Written Opinion of International Application No. PCT/US2017/051734, dated Dec. 6, 2017 (12 pages).

\* cited by examiner

LASER WELDING SYSTEM AND METHOD USING COOLING MASK TO CONTROL THE WIDTH OF THE WELD

FIELD OF THE INVENTION

This invention relates generally to laser welding of thermoplastic materials.

BACKGROUND OF THE INVENTION

Various ways to weld clear thermoplastic sheets into packages are known. The packages are typically made of clear plastic sheets (e.g., blister packages) by using RF welding methods, which are limited to a small number of thermoplastic materials (in practice, mostly PVC-based), which have the requisite electrical properties, such as a relatively high dielectric loss that provides the ability to convert alternating electric fields into heat. The process is not applicable or have very limited applicability to the most common plastics, from polyolefines to PC to Polystyrene to Polycarbonate, which in turn severely limits the material selection available for blister packaging. With a current campaign to limit the use of PVC because of its environmental hazard—recycling process for PVC is hazardous to various degrees due to the material's inherent chlorine content, as well as the range of chemical additives used for increasing material stability and variety in usage properties, the ability to utilize a wide range of thermoplastics for manufacturing of blister packages offers significant environmental benefits.

Another problem of RF welding is inflexibility of the process, as the seam is limited by the shape and size of the electrodes—each package's shape would require the electrodes of a specific shape and size. Also, in practice the size of the package is limited by the required power capacity, as the RF is known by very high power requirements to achieve material melting. For example, for a perimeter seal of a 10 cm×15 cm medical bag, the power requirements range from 1.7 to 2.9 KW (Plastics and Composites Welding Handbook, Hanser Gardner Publications, Inc., 2003. p. 262).

Laser welding of plastics has established itself as a robust, flexible and precise welding process, which is increasingly used to join plastic parts. It enables highly efficient and flexible assembly processes from small-scale production of parts with complex and varying geometries to a high volume industrial manufacturing where it can be easily integrated into automation lines.

Laser welding uses a laser beam to melt the plastic in the joint area by delivering controlled amount of energy to a precise location. This is based on the ease of controlling the beam size and the range of methods available for precise positioning and moving the beam.

The process is based on the same basic requirements of material compatibility as other welding techniques, but is often found to be more forgiving of resin chemistry or melt temperature differences than most other plastic welding processes. Nearly all thermoplastics can be welded using a proper laser source and appropriate joint design.

Other objects and advantages of the invention will be apparent from the following detailed description of illustrative embodiments, taken in conjunction with the accompanying drawings.

SUMMARY OF THE INVENTION

In accordance with one embodiment, a laser welding method is provided for joining portions of first and second workpieces of thermoplastic material that is partially permeable to a laser beam but absorbs radiation from the laser beam. The method comprises clamping together the portions of said first and second workpieces to be joined, the first and second workpieces being made of material that absorbs radiation from a laser beam; placing a mask on a first surface of the first workpiece, the first surface being opposite the surface engaging the second workpiece, the mask being impermeable to a laser beam and forming a slot for passing a laser beam to the portion of the first surface of the upper workpiece exposed by the slot, so that heating and melting of the material of the workpieces is limited to the width of the slot; directing a laser beam onto the slot and moving the laser beam in a manner to illuminate the slot and to melt and join the first and second workpieces along the slot while the workpieces remain clamped together; and cooling the molten portions of the first and second workpieces to solidify the joined portions of the workpieces and form a weld seam while the workpieces remain clamped together. The laser beam is preferably an optical fiber laser beam having a wavelength of about 2 microns.

The invention also contemplates a laser welding system for joining portions of first and second workpieces made of thermoplastic material that is partially permeable to a laser beam but absorbs radiation from the laser beam. The system includes a pair of clamping plates positioned to engage opposite sides of the first and second workpieces when the workpieces are adjoining each other with contacting surfaces; an actuator urging at least one of the clamping plates toward the other clamping plate to press the workpieces together; a mask on the opposite side of the first workpiece from the second workpiece, the mask being impermeable to the laser beam and forming a slot for passing the laser beam to the portion of the first workpiece exposed by the slot, so that heating and melting of the material of the workpieces is limited to the width of the slot; a laser beam source directing a laser beam into the slot; and a drive unit moving the laser beam to melt and join the first and second workpieces along the slot while the workpieces remain clamped together. In one embodiment, the mask absorbs heat from the first workpiece to cool the portions of the first workpiece not exposed to the laser beam. The laser beam is preferably an optical fiber laser beam having a wavelength of about 2 microns.

DETAILED DESCRIPTION OF ILLUSTRATED EMBODIMENTS

Figure 1:
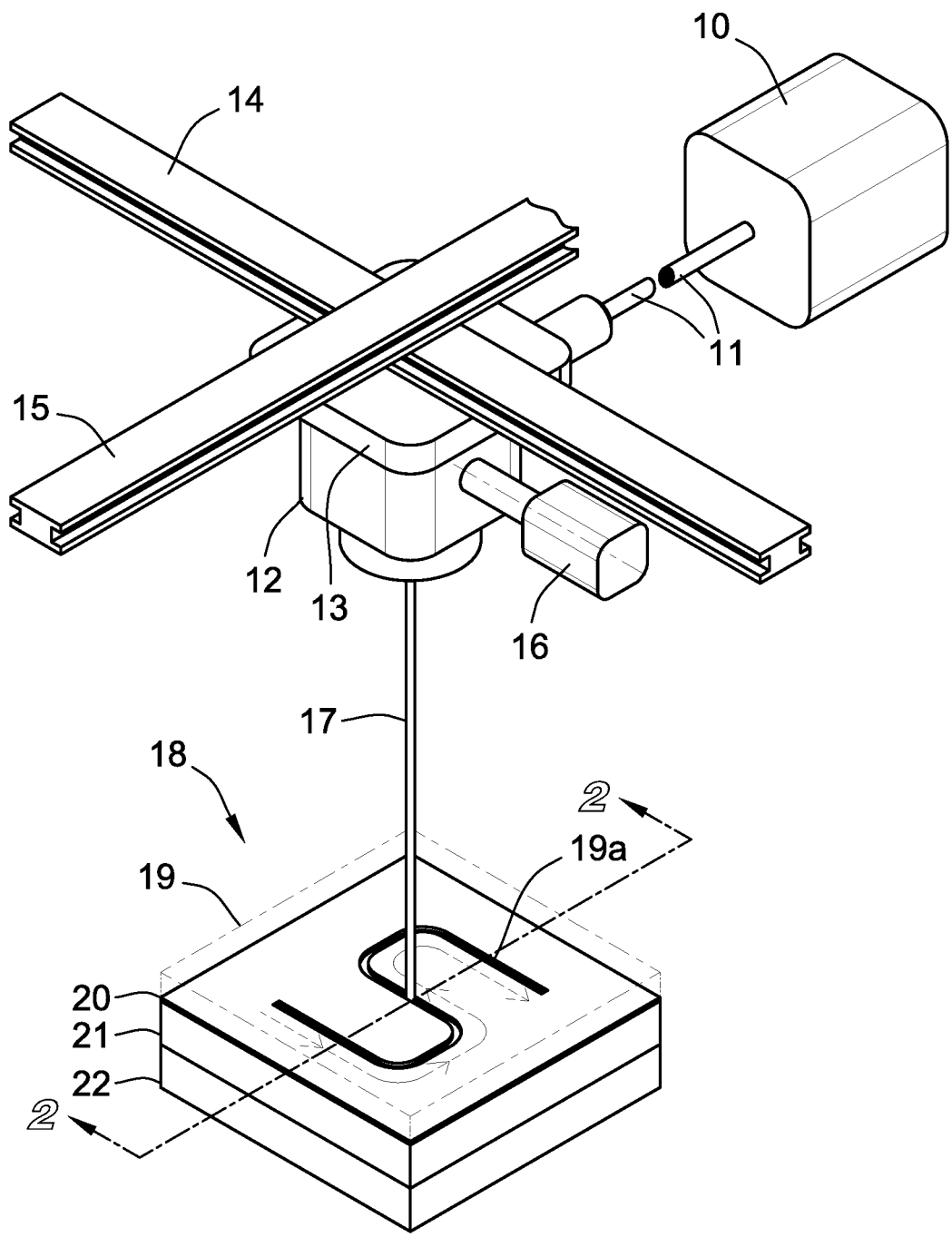
FIG. 1 is a perspective view of a laser welding arrangement for welding two thermoplastic workpieces.
Figure 2:
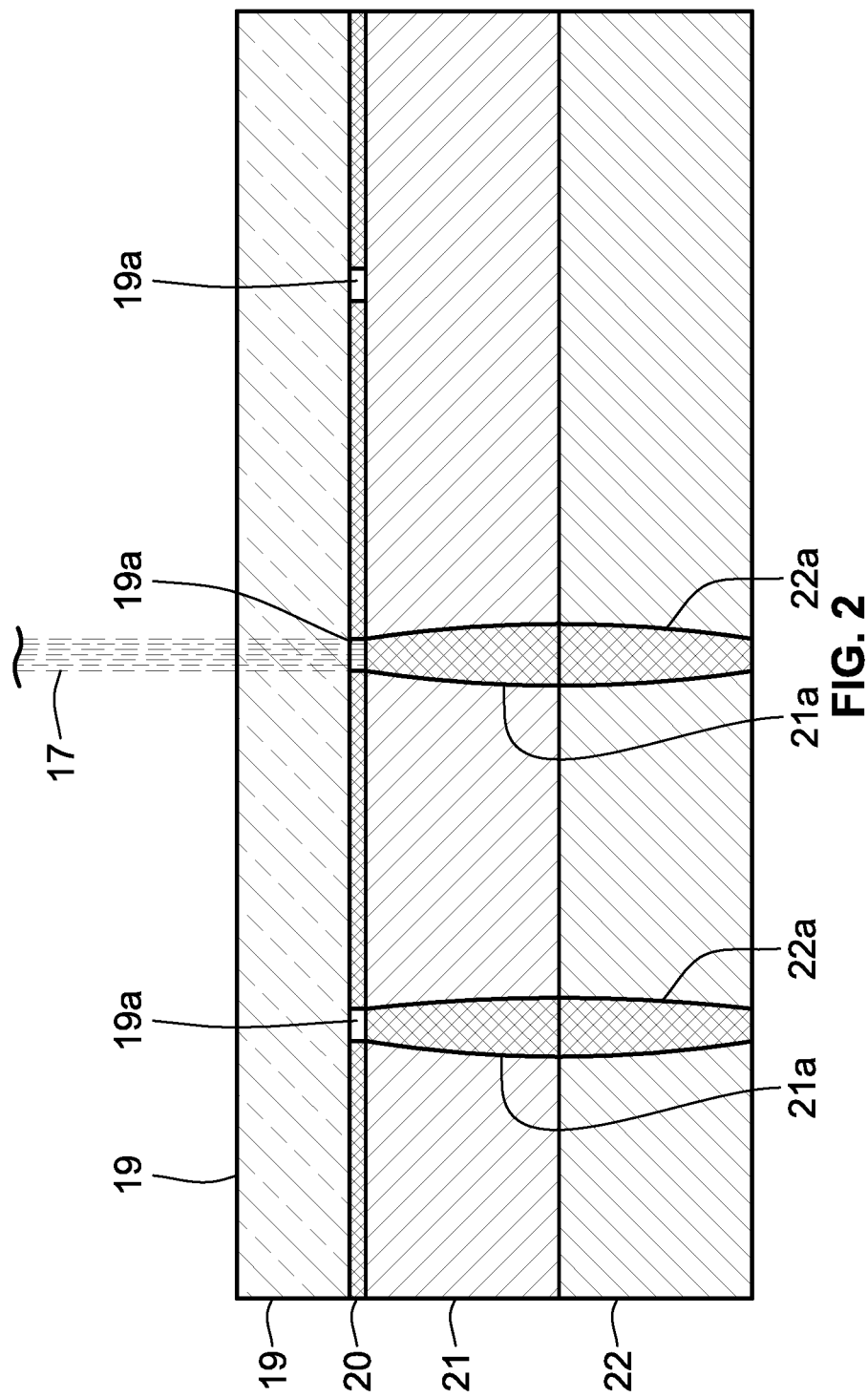
FIG. 2 is an enlarged sectional view taken along line 2-2 in FIG. 1.

Although the invention will be described in connection with certain preferred embodiments, it will be understood that the invention is not limited to those particular embodiments. On the contrary, the invention is intended to cover all alternatives, modifications and equivalent arrangements as may be included within the spirit and scope of invention as defined by the appended claims.

Turning now to the drawings, a laser source 10 generates a laser that is transmitted through a fiber cable 11 to a scan head 12 attached to a mount 13. The mount 13 is coupled to orthogonal gantries 14 and 15. One or more scanner mirrors within the scan head 12 are controlled by a processor-controlled drive unit 16 to direct a laser beam 17 downwardly onto a stack 18 that includes two thermoplastic workpieces 21 and 22 to be joined by welding. The drive unit 16 is controlled to adjust the positions of the scanner mirrors to move the laser beam 17 in a manner required to illuminate a prescribed weld zone on the top surface of the stack 18.

The top layer 19 in the stack 18 is a transparent glass plate 19 that has a reflective-coated photo mask 20 on the bottom surface of the glass plate 19. The mask 20 forms a slot 20a that permits the laser beam 17 to reach the upper workpiece 21, which at least partially absorbs the laser radiation. The mask 20 limits the exposed area of the workpieces 21 and 22 to the desired weld zone defined by the slot 20a, and thus limits the melting of the upper workpiece 21 to the desired weld zone. In addition, the mask 20 functions as a heat sink and cools the surface of the workpiece 21 in the areas outside the weld zone. In an alternative embodiment, the mask 20 is on the top surface rather than the bottom surface of the glass plate 19. One suitable material for the mask is chrome plated on the surface of the glass plate 19.

The movement of the scanner mirrors is controlled by the processor that controls the drive unit 16. When welding large parts, the movement of the laser beam 17 is controlled by driving the mount 13 along the gantries 14 and 15.

The basic welding technique used in the illustrated system provides significant advantages over through transmission laser welding (TTLW), in which the workpieces are pre-assembled and clamped together to provide an intimate contact between their joining surfaces. The laser beam is then delivered to the interface of the workpieces' interface through the upper transparent workpiece and is absorbed by the lower absorbing workpiece, which converts infrared energy into heat. Carbon black and specially designed absorbers are blended into the resin of the lower workpiece, or applied to the surface, to enable infrared radiation to be absorbed in the lower workpiece. The heat is conducted from the lower absorbing workpiece to the upper workpiece to melt the upper workpiece at the interface and form a bond. Precise positioning and clamping of the assembly ensures the intimate contact required for heat transfer between the parts.

Because the TTLW welding technique is dependent on the presence of an absorbing agent in the lower workpiece, it limits the applicability of this assembly process for manufacturing of medical devices, electronics, some consumer goods and packaging applications where a "clear-to-clear" or a "clear-to-colored" assembly is required. However, a laser having a wavelength of about 2 microns, commonly referred to as a "2 micron laser," is characterized by a greatly increased absorption by unfilled polymers, enabling a highly controlled melting through the thickness of plastic materials that do not have any absorbing agents and can be transparent in the visible wavelength range, i.e., "optically clear" parts such as polycarbonate or acrylic, without the need for any laser sensitive additives.

In the present invention, both workpieces absorb portions of the laser beam (preferably a fiber laser), and the adjacent contact surfaces of these two work pieces are bonded together in subsequent cooling under pressure. The laser beam is directed at the contact surfaces at essentially a right angle through the mask so that the width of the laser beam spot on the upper workpiece is limited by the slot width in the mask. Thus, the melting of the upper part is limited by the width of the slot in the mask as the beam is moved. The workpieces are bonded together in subsequent cooling under pressure.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

The invention claimed is:

1. A laser welding system comprising:
   a laser beam source configured to emit a laser beam having a wavelength of about 2 microns;
   a first workpiece made of thermoplastic material that is optically transparent and partially permeable to said laser beam;
   a second workpiece made of thermoplastic material that optically transparent and partially permeable to said laser beam;
   a pair of clamping plates positioned and configured to engage opposite sides of said first and second workpieces when said first and second workpieces are adjoining each other with contacting surfaces, said pair of clamping plates being positioned relative to the laser beam source such that both said first and second workpieces partially absorb said laser beam to cause heating and melting in respective portions of said first and second workpieces;
   an actuator configured to urge at least one of said pair of clamping plates toward the other one of said clamping plates to press said first and second workpieces together;
   a transparent glass plate;
   a mask on the opposite side of said first workpiece from said second workpiece, said mask being impermeable to said laser beam and forming a slot for passing said laser beam to the portion of said first workpiece exposed by said slot, so that heating and melting of the material of said first and second workpieces is limited to the width of said slot, said mask being positioned on said transparent glass plate to absorb heat from said first workpiece to cool the portions of said first workpiece not exposed to said laser beam; and
   a drive unit configured to move said laser beam to illuminate said slot.

2. The laser welding system of claim 1, wherein each of said first and second workpieces lacks any absorbing agents.

3. The laser welding system of claim 2, wherein each of said first and second workpieces is composed of a polycarbonate or acrylic.

4. The laser welding system of claim 1 wherein said laser beam has an optical fiber beam.

5. The laser welding system of claim 1, wherein said laser beam is substantially perpendicular to said mask.

6. The laser welding system of claim 1, wherein said mask is chrome plated on glass.

7. The laser welding system of claim 1, wherein each of said first and second workpieces is an unfilled polymer that is can be optically transparent, and said laser beam is partially absorbed by said polymer.

8. The laser welding system of claim 1, wherein said mask is a reflective-coated photo mask on a bottom surface of said glass plate facing said first workpiece.

9. The laser welding system of claim 1, wherein said mask is on a top surface of said glass plate opposite a bottom surface thereof, said bottom surface facing said first workpiece.

* * * * *